United States Patent
Wu et al.

(10) Patent No.: US 7,907,404 B2
(45) Date of Patent: Mar. 15, 2011

(54) FAN MODULE

(75) Inventors: Jian-Feng Wu, Shanghai (CN); Shou-Jen Yang, Taipei (TW)

(73) Assignee: Inventec Corporation, Taipei (TW)

( * ) Notice: Subject to any disclaimer, the term of this patent is extended or adjusted under 35 U.S.C. 154(b) by 5 days.

(21) Appl. No.: 12/397,581

(22) Filed: Mar. 4, 2009

(65) Prior Publication Data

US 2010/0027215 A1 Feb. 4, 2010

(30) Foreign Application Priority Data

Jul. 31, 2008 (CN) .......................... 2008 1 0129605

(51) Int. Cl.
*H05K 7/20* (2006.01)
*F16F 7/00* (2006.01)
*F01D 25/04* (2006.01)
*G06F 1/20* (2006.01)

(52) U.S. Cl. .................... 361/695; 361/679.48; 248/635; 248/638; 267/136; 267/140.11; 267/141; 415/119; 415/213.1; 416/500

(58) Field of Classification Search ............ 361/679.48, 361/694–695, 719; 165/80.2–80.3, 121–122; 174/16.1; 248/605, 608–609, 634–635, 638; 267/136, 140, 141; 411/512; 415/119, 213.1, 415/214.1, 232; 416/244 R, 500; 417/363, 417/423.7; 312/223.2, 236; 454/184
See application file for complete search history.

(56) References Cited

U.S. PATENT DOCUMENTS

| | | | |
|---|---|---|---|
| 7,379,300 B1 * | 5/2008 | Chen | 361/695 |
| 7,385,814 B1 * | 6/2008 | Chen | 361/695 |
| 7,545,641 B2 * | 6/2009 | Chen | 361/695 |
| 7,618,309 B2 * | 11/2009 | Liang | 454/184 |
| 7,748,955 B2 * | 7/2010 | Lee | 415/119 |
| 2009/0196680 A1 * | 8/2009 | Hu et al. | 403/102 |
| 2009/0196684 A1 * | 8/2009 | Hu et al. | 403/353 |
| 2010/0025017 A1 * | 2/2010 | Zhang et al. | 165/104.31 |
| 2010/0027231 A1 * | 2/2010 | Chang et al. | 361/807 |

FOREIGN PATENT DOCUMENTS

| | | | | |
|---|---|---|---|---|
| JP | 2000027799 A | * | 1/2000 | |
| KR | 2002068687 A | * | 8/2002 | |
| TW | 200823424 A | * | 6/2008 | |

* cited by examiner

*Primary Examiner* — Robert J Hoffberg
(74) *Attorney, Agent, or Firm* — J.C. Patents

(57) ABSTRACT

A fan module of the present invention is disclosed. The fan module is used to be fixed on a first bottom board of a chassis and includes a frame, a circuit board, a plurality of elastic gaskets, a plurality of fixing parts and a plurality of fans. The frame has a second bottom board having a plurality of first openings. The fans are disposed in the frame. The circuit board is fixed onto the frame between the second bottom board and the fans, and electrically connected to the fans. Each of the elastic gaskets is respectively locked at a first opening of the second bottom board and contacts and interferes the first bottom board and the circuit board. In addition, each of the fixing parts respectively goes through a first opening and an elastic gasket and is fixed on the first bottom board of the chassis.

20 Claims, 6 Drawing Sheets

FAN MODULE

CROSS-REFERENCE TO RELATED APPLICATION

This application claims the priority benefit of China application serial no. 200810129605.5, filed Jul. 31, 2008. The entirety of the above-mentioned patent application is hereby incorporated by reference herein and made a part of specification.

BACKGROUND OF THE INVENTION

1. Field of the Invention

The present invention generally relates to a fan module, and more particularly, to a fan module having elastic gaskets.

2. Description of Related Art

A server mostly uses a plurality of fans to dissipate heat thereof, wherein the fans are disposed in a frame to form a fan module providing a strong cooling airflow.

In the server, the fan modules are mostly fixed on a bottom board of the chassis thereof by screws or are locked on the chassis by spring strips and other appurtenances. During running the fans, the assemblies generate vibration accompanied with noise. Stronger vibration may even effect the normal work of other subassemblies, for example, the hard disk, of the server. In order to solve the vibration and noise problem, the most common solution is to dispose gaskets between each fan and the frame for absorbing vibration and thereby reducing noise. Another solution is to dispose a special antivibration structure for each vibration-sensitive subassembly, for example, a hard disk, to absorb vibration. However, the above-mentioned solution, wherein a corresponding gasket is respectively disposed between each fan and the frame so as to avoid the vibration generated by anyone of the fans from being transferred to the chassis of the server via the frame, is disadvantageous not only in increasing the time and labor for assembling and detaching the fans, but also in raising the part cost.

SUMMARY OF THE INVENTION

Accordingly, the present invention is directed to a fan module able to absorb vibration integratively aimed at a frame, not individually at each fan, so as to reduce the time, labor and part cost required for absorbing vibration.

The present invention is also directed to a fan module, wherein each fan is directly connected to the frame, so the vibration generated by each fan is avoided from being transferred to the chassis or other subassemblies of the server.

The present invention is further directed to a fan module equipped with an antivibration structure which is easily installed and detached.

The present invention provides a fan module used to be fixed on a first bottom board of a chassis. The fan module includes a frame, a circuit board, a plurality of first elastic gaskets, a plurality of first fixing parts and a plurality of fans. The frame has a second bottom board, wherein the second bottom board has a plurality of first openings. The fans are disposed in the frame. The circuit board is fixed onto the frame, disposed between the second bottom board and the fans and electrically connected to the fans. Each of the first elastic gaskets is respectively locked into one of the first openings of the second bottom board, and contacting and interfering the first bottom board and the circuit board. Each of the first fixing parts respectively goes through one of the first openings and one of the first elastic gaskets, and is fixed on the first bottom board of the chassis.

In an embodiment of the fan module, each of the first elastic gaskets has a through hole, a first collar portion, a second collar portion and a jointing portion. The through hole goes through the first elastic gasket itself and the corresponding first fixing part goes through the through hole. The first collar portion is located between the first bottom board and the second bottom board, and contacting and interfering the first bottom board. The second collar portion is located between the circuit board and the second bottom board, and contacting and interfering the circuit board. The jointing portion connects the first collar portion and the second collar portion, wherein the diameter of the jointing portion is less than the diameters of the first collar portion and the second collar portion, and the jointing portion is locked on the hole wall of the corresponding first opening. In addition, each of the first openings has, for example, a first part and a second part connecting each other, and all the first parts are located at the same sides of the corresponding second parts. The dimension of each of the first parts is greater than or equal to the diameter of the corresponding first collar portion; the dimension of each of the second parts is less than the diameter of the corresponding first collar portion but greater than or equal to the diameter of the corresponding jointing portion.

In an embodiment of the fan module, the jointing portion of each of the first elastic gaskets is locked on the hole wall of the second part of the corresponding first opening.

In an embodiment of the fan module, the circuit board has a plurality of second openings respectively corresponding to the position of each of the first elastic gaskets, and an end of each of the corresponding first fixing parts is located in the corresponding second openings.

In an embodiment of the fan module, the dimension of each of the second openings is greater than or equal to the diameter of the corresponding first fixing part but less than the diameter of each of the second collar portions of the first elastic gaskets.

In an embodiment of the fan module, the frame further has two side boards and a plurality of clapboards. The side boards are parallel to each other and vertically connect the second bottom board, the clapboards vertically connect the side boards, and each of the fans is located in the space provided by the two side boards and two adjacent ones of the clapboards. Each of the side boards has a plurality of apertures corresponding to the fans. In addition, each of the side boards has, for example, a locking slot structure and the circuit board is locked between the locking slot structures. Moreover, the chassis further includes a fans-fixing board perpendicular to the first bottom board, and the fan module further includes a plurality of screws and a plurality of washers. One of the side boards in the frame has a plurality of locking holes, and each of the screws goes through one of the locking holes and one of the washers to be fixed onto the fans-fixing board of the chassis.

In an embodiment of the fan module, the circuit board has a power socket and a plurality of fan connectors, wherein the power socket is for plugging into an external power source and each of the fans plugs into the corresponding fan connector.

In an embodiment of the fan module, the circuit board has a third opening locking to a second elastic gasket, wherein a second fixing part goes through both the third opening and the second elastic gasket to be fixed on the first bottom board of the chassis.

In an embodiment of the fan module, the third opening has a notch at the edge of the circuit board.

In an embodiment of the fan module, the second elastic gasket has a through hole, a first collar portion, a second collar portion and a jointing portion. The through hole goes through the second elastic gasket and a second fixing part goes through the through hole. The first collar portion is located between the circuit board and the second bottom board, and contacting and interfering the first bottom board. The jointing portion connects the first collar portion and the second collar portion, wherein the diameter of the jointing portion is less than the diameters of the first collar portion and the second collar portion and the jointing portion is locked on the hole wall of the third opening.

In an embodiment of the fan module, the dimension of the notch of the third opening is greater than or equal to the diameter of the jointing portion of the second elastic gasket.

In an embodiment of the fan module, the first bottom board has a supporting part disposed at the position corresponding to the place fixing the second fixing part, and the second fixing part is a screw.

In an embodiment of the fan module, the material of the first elastic gaskets is an antivibration material.

In an embodiment of the fan module, the first bottom board has a plurality of supporting parts at the positions corresponding to the places respectively fixing each of the first fixing parts.

In an embodiment of the fan module, each of the first fixing parts is a screw.

In an embodiment of the fan module, the second bottom board further has a plurality of dent regions denting toward the circuit board, the first openings are located at the dent regions, and the thickness of the portion of each of the first elastic gaskets between the first bottom board and the second bottom board is greater than the dent depth of the corresponding dent region.

In summary, in the fan module of the present invention, the elastic gaskets are disposed between the frame of the fan module and the bottom board of the chassis. Therefore, the present invention does not need to dispose a plurality of elastic gaskets respectively between each fan and the frame. Therefore, in the present invention, only fewer elastic gaskets can avoid the vibrations generated by the fans from being transferred to the chassis via the frame. In this way, the elastic gaskets of the invented fan module require less time for assembling and less labor and part cost.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
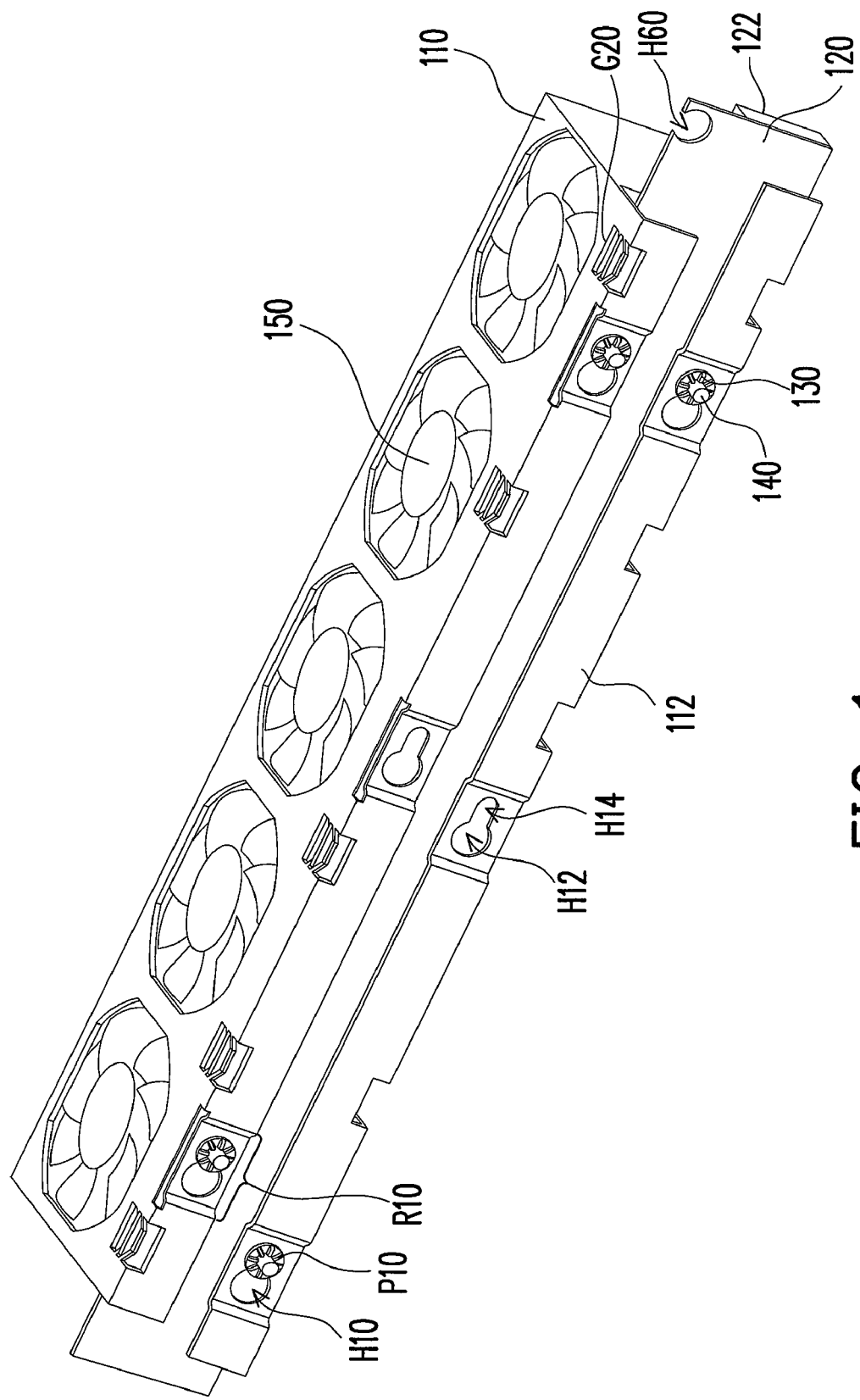
FIG. 1 is a diagram of a fan module according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
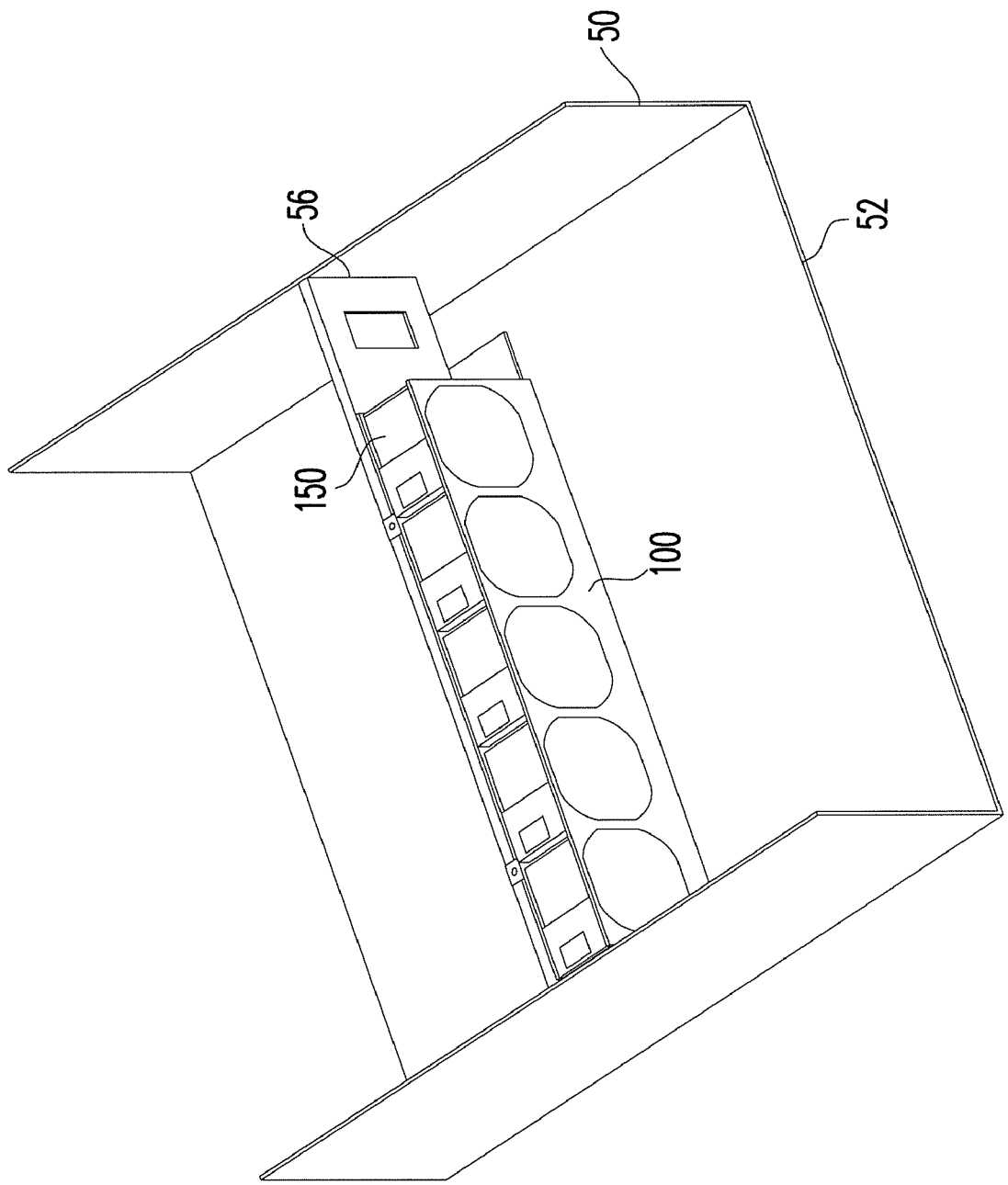
FIG. 2 is a diagram showing the fan module of FIG. 1 assembled onto a chassis.

FIG. 1 is a diagram of a fan module according to an embodiment of the present invention and FIG. 2 is a diagram showing the fan module of FIG. 1 assembled onto a chassis. Referring to FIG. 2, the fan module 100 of the present invention is used to be fixed on a bottom board 52 of a chassis 50, and FIG. 2 illustrates a part of the chassis 50 and the chassis 50 can be a chassis of a server or shells of other electronic devices.

The fan module 100 includes a frame 110, a circuit board 120, a plurality of the first elastic gaskets 130, a plurality of the first fixing parts 140 and a plurality of fans 150. The frame 110 has a second bottom board 112 having a plurality of the first openings H10. A circuit board 120 is fixed to the frame 110, located between the second bottom board 112 and the fans 150 and electrically connected to the fans 150. Each of the first elastic gaskets 130 is respectively locked to one of the first openings H10 of the second bottom board 112 and contacting and interfering the first bottom board 52 and the circuit board 120. Referring to FIG. 1, the first elastic gaskets 130 can be seen outside the second bottom board 112. In fact, the first elastic gaskets 130 are located between the fan module 100 of FIG. 1 and the first bottom board 52, and the exact positions thereof are shown in the following diagrams. Each of the first fixing parts 140 goes through an first opening H10, an second opening H20 and an first elastic gasket 130 so as to entirely fix the fan module 100 onto the first bottom board 52 of the chassis 50. The first fixing parts 140 can be screws, and the materials thereof are, for example, metal or other appropriate materials. It should be noted that in FIG. 1, some of the first fixing parts 140 and the first elastic gaskets 130 are omitted so as to clearly show the entire first opening H10. The fans 150 are disposed in the frame 110 and respectively connect to the circuit board 120, to receive the control signal and the power from it for running.

In the fan module 100 of the present invention, the first elastic gaskets 130 are located between the second bottom board 112 of the frame 110 and the first bottom board 52 of the chassis 50, so that the vibration generated by individual one of the fans 150 can be transferred to the frame 110. However, the first elastic gaskets 130 are able to block the vibration from further being transferred to the chassis 50 to achieve the effect of antivibration and reducing noise. In addition, for the fan module 100 of the embodiment, there is no need to design antivibration structures aimed at each fan 150; instead, the first elastic gaskets 130 are disposed between the whole frame 110 and the first bottom board 52 of the chassis 50. Therefore, the fan module 100 of the embodiment is advantageous in reducing the time for assembling, labor and parts cost. Besides, since each fan 150 has no additional antivibration structure, in overall point of view, the fan's structure is much simpler. As the fans 150 without additional antivibration structure of the embodiment is much easier than the prior art to perform the hot plug function.

Referring to FIGS. 1 and 2, the second bottom board 112 further has a plurality of dent regions R10 denting toward the circuit board 120. The first openings H10 are respectively located at each of the dent regions R10. The thickness of the portion of each first elastic gaskets 130 between the first bottom board 52 and the second bottom board 112 is greater than the dent depth of each dent region R10 so as to avoid the first bottom board 52 from directly contacting the second bottom board 112.

Figure 3:
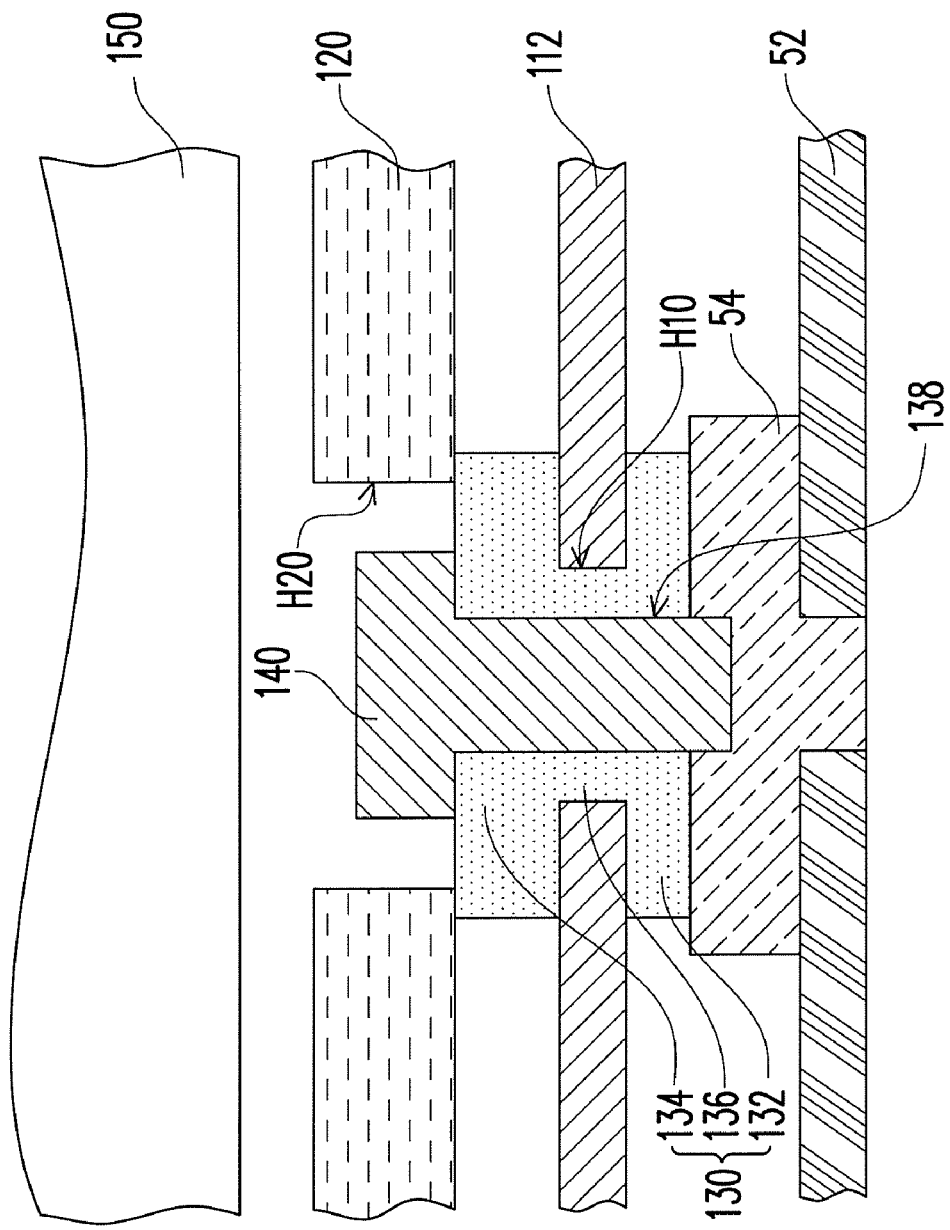
FIG. 3 is a localized sectional view of the fan module of FIG. 1 at a place where an elastic gasket is disposed.

FIG. 3 is a localized sectional view of the fan module of FIG. 1 at a place where an first elastic gasket is disposed.

Referring to FIG. 3, each of the first elastic gaskets 130 has a through hole 138, a first collar portion 132, a second collar portion 134 and a jointing portion 136. The through hole 138 goes through the first elastic gasket 130 and for the corresponding first fixing part 140 to go through. The first collar portion 132 and the second collar portion 134 are respectively roughly a collar-shape plate, and a protrusive portion P10 is disposed on the surface of the first collar portion 132 (shown in FIG. 1) to reduce the contact area between the first collar portion 132 and the first bottom board 52 for enhancing the effect of absorbing vibration. The first collar portion 132 is located between the first bottom board 52 of the chassis 50 and the second bottom board 112 of the frame 110, contacting and interfering the first bottom board 52. The first collar portion 132 serves as the major structure to achieve the effect of absorbing vibration in the embodiment. The first collar portion 132 and the second collar portion 134 are respectively located opposite to each other at two sides of the second bottom board 112, and the second collar portion 134 is located between the circuit board 120 and the second bottom board 112, contacting and interfering the circuit board 120. In the embodiment, the second collar portion 134 is located right under the fan 150, but the second collar portion 134 can be optionally located between two adjacent fans 150. The jointing portion 136 connects the first collar portion 132 and the second collar portion 134, wherein the diameter of the jointing portion 136 is less than the diameters of the first collar portion 132 and the second collar portion 134 and the jointing portion 136 is locked on the hole wall of the corresponding first opening H10. In more details, the jointing portion 136 has a tube figure, encloses the first fixing part 140 and together with the first fixing part 140 passes through the first opening H10.

In the embodiment, the circuit board 120 is located between the fans 150 and the second bottom board 112. The material of the first elastic gaskets 130 includes rubber, silicon glue or other shockproof materials. The first fixing parts 140 are respectively fixed and supported on a plurality of supporting parts 54 on the first bottom board 52 (in FIG. 3 only one is shown) and each first collar portion 132 is located between the corresponding supporting part 54 and the second bottom board 112 of the frame 110. In more details, the supporting part 54 is fixed on the first bottom board 52 of the chassis 50 and the first fixing part 140 is fixed on the supporting part 54. The circuit board 120 has, for example, a plurality of the second openings H20 (only one is shown in FIG. 3), where the second openings H20 expose an end of each of the first fixing parts 140 for tightening the first fixing parts 140 of screw structure.

Continuing refer to FIGS. 1 and 3, each of the first openings H10 in the embodiment has a first part H12 and a second part H14 connecting each other, and all the first parts H12 of the first openings H10 are respectively located at the same sides of the second parts H14. The dimension of each of the first parts H12 is greater than or equal to the diameter of the corresponding first collar portion 132; the dimension of each of the second parts H14 is less than the diameter of the corresponding first collar portion 132 but greater than or equal to the diameter of the corresponding jointing portion 136. In this way, after the first fixing parts 140 and the first elastic gaskets 130 are together fixed at the second openings H20 of the circuit board 120, the first collar portions 132 of the first elastic gaskets 130 can respectively pass through the first parts H12 of the first openings H10, followed by moving the circuit board 120, the first fixing parts 140 and the first elastic gaskets 130 together towards the second parts H14 of the first openings H10. At the time, since the dimension of each of the second parts H14 is less than the diameter of each of the first collar portions 132, the circuit board 120 and the first bottom board 112 can be properly locked by each other.

The jointing portion 136 of each of the first elastic gaskets 130 is locked on the hole wall of the second part H14 of the corresponding first opening H10. The circuit board 120 has a plurality of first openings H10 respectively corresponding to the position of each first elastic gasket 130, and an end of the corresponding first fixing part 140 is located in each of the first openings H10, wherein the dimension of each first opening H10 is greater than or equal to the dimension of each first fixing part 140 but less than the diameter of each second collar portion 134.

Figure 4:
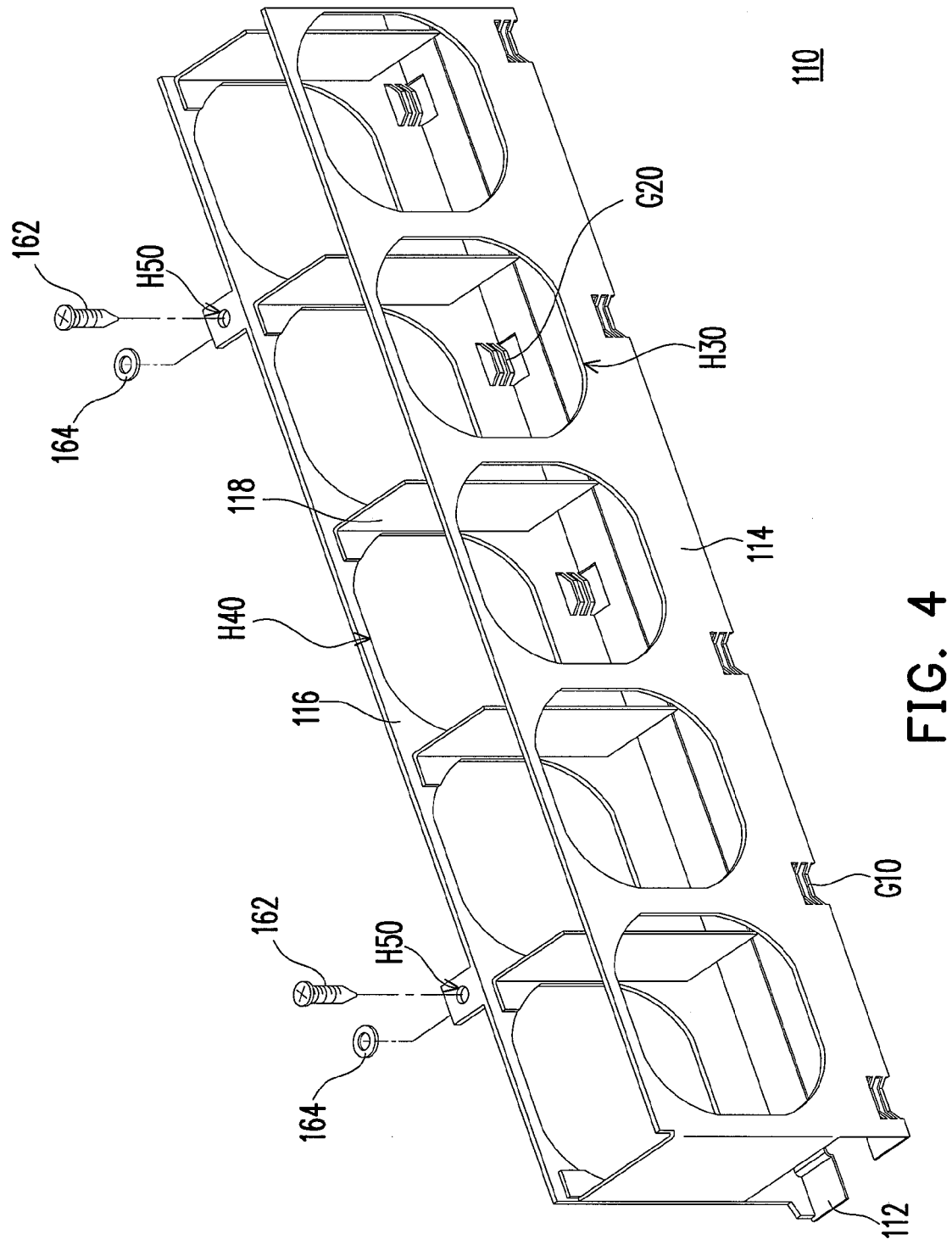
FIG. 4 is a diagram of the frame of the fan module of FIG. 1.

FIG. 4 is a diagram of the frame of the fan module of FIG. 1. Referring to FIG. 4, the frame 110 of the embodiment has a first bottom board 112, two side boards 114 and 116 and a plurality of clapboards 118. The side boards 114 and 116 are parallel to each other and vertically connect the first bottom board 112; the first bottom board 112 includes, for example, two portions which are perpendicular to the side boards 114 and 116 and can be seen as the extensions of the side boards 114 and 116. The clapboards 118 vertically connect the side boards 114 and 116, wherein the two outermost clapboards 118 can be seen as the extensions in right angle of the side board 114. Each of the fans 150 is respectively located in a space enclosed by the first bottom board 112, the two side boards 114 and 116 and two adjacent clapboards 118. The side board 114 has a plurality of apertures H30 corresponding to the fans 150, the side board 116 has a plurality of apertures H40 corresponding to the fans 150 as well and the apertures H30 and H40 serve as the accesses of the airflow. The side boards 114 and 116 respectively have a locking slot structure G10 and a locking slot structure G20. The circuit board 120 (shown in FIG. 1) is locked between the two locking slot structures G10 and G20. Referring to FIGS. 2 and 4, the fan module 100 can further include a plurality of screws 162 and a plurality of washers 164. In addition, the side board 116 has a plurality of locking holes H50, and each of the screws 162 passes through one of the locking holes H50 and one of the washers 164 to fix the fan module 100 onto a fans-fixing board 56 of the chassis 50. The fans-fixing board 56 is perpendicular to the first bottom board 52, and the washers 164 are located, for example, between the side board 116 and the fans-fixing board 56.

Figure 5:
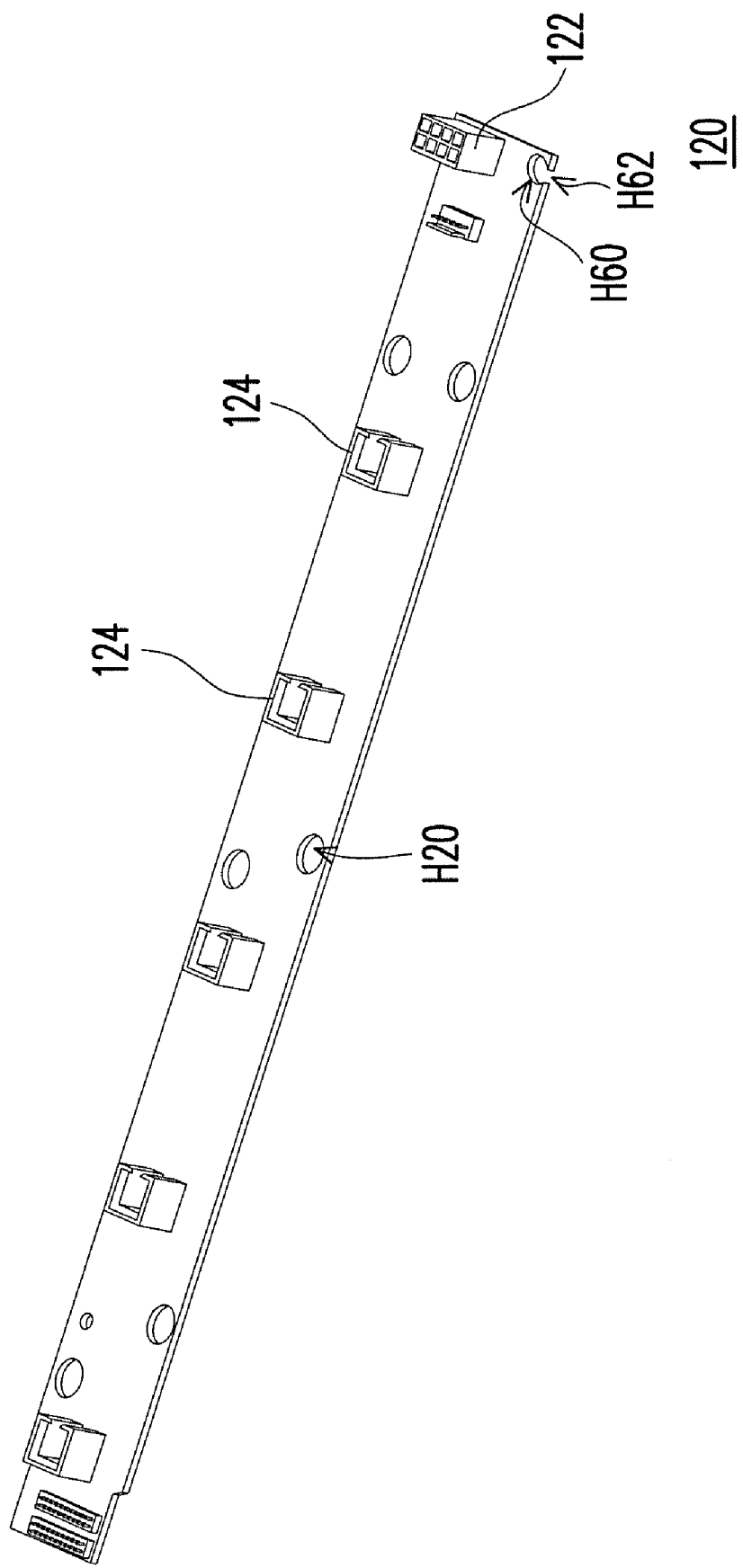
FIG. 5 is a diagram of the circuit board of the fan module of FIG. 1.

FIG. 5 is a diagram of the circuit board of the fan module of FIG. 1. Referring to FIG. 5, the circuit board 120 of the embodiment has a power socket 122 and a plurality of fan connectors 124. The power socket 122 is for plugging into an external power source (not shown), which is, for example, the power supply of a server. Each of the fans 150 is plugged in the corresponding fan connector 124. Each fan 150 has, for example, a corresponding connector (not shown) for directly plugging into the fan connector 124; the fans 50 can also optionally plug into the corresponding fan connectors 124 through additional wires (not shown). The power received by the power socket 122 is distributed to each of the fan connectors 124 via the circuit of the circuit board 120, followed by further delivering the power to each fan 150 for running. In addition, the fan connectors 124 can also deliver the control signals to control the running of the fans 150.

Figure 6:
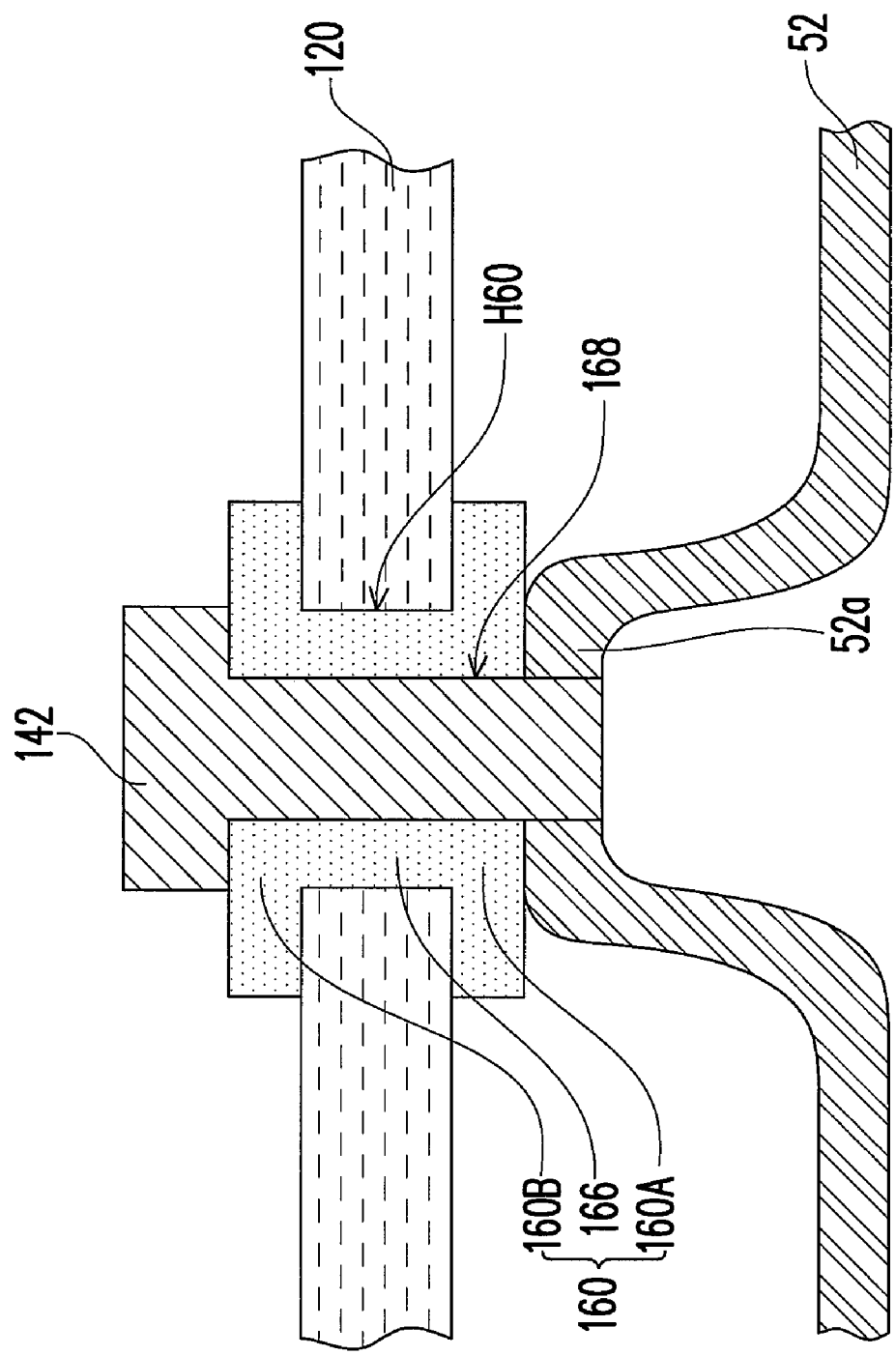
FIG. 6 is a localized sectional view of the fan module of FIG. 1 at a place where an third opening of the circuit board is located.

FIG. 6 is a localized sectional view of the fan module of FIG. 1 at a place where an third opening of the circuit board is located. Referring to FIGS. 5 and 6, each of the second elastic gasket 160 has a through hole 168, a first collar portion 160A, a second collar portion 160B and a jointing portion 166, the circuit board 120 further has an third opening H60 which has a notch H62 at the edge of the circuit board 120, wherein the span size of the notch H62 is greater than or equal to the diameter of the jointing portion 166 of the second elastic gasket 160. The second elastic gasket 160 and the second fixing part 142 are disposed in the third opening H60, wherein the dimension of the second elastic gasket 160 and the diameter of the second fixing part 142 disposed in the third opening H60 are not necessarily the same as the dimension of the first elastic gaskets 130 and the diameter of the first fixing part 140 disposed in the first openings H10 shown in FIG. 3. The second bottom board 52 of the chassis 50 has a protruding portion 52a corresponding to the third opening H60, and the circuit board 120 is fixed to the protruding portion 52a through the second elastic gasket 160 and the second fixing part 142.

In summary, in the fan module of the present invention, the elastic gaskets are disposed between the whole fan module and the chassis. Therefore, the vibrations generated by all the fans can be absorbed by the elastic gaskets and are not transferred to the chassis, which further reduces the noise. In other words, the vibrations generated by all the fans in the fan module of the present invention are transferred onto the frame of the fan module and then absorbed by the elastic gaskets without individually designing an antivibration structure aimed at each fan, which is advantageous in reducing the time for assembling, labor and part cost.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fan module, used to be fixed on a first bottom board of a chassis, the fan module includes:
    a frame, having a second bottom board, wherein the second bottom board has a plurality of first openings;
    a plurality of fans, disposed in the frame;
    a circuit board, fixed onto the frame, disposed between the second bottom board and the fans and electrically connected to the fans;
    a plurality of first elastic gaskets, each of the first elastic gaskets locked into each of the first openings of the second bottom board, and contacting and interfering the first bottom board and the circuit board; and
    a plurality of first fixing parts, each of the plurality of first fixing parts going through one of the first openings and one of the first elastic gaskets, and fixed on the first bottom board of the chassis.

2. The fan module as claimed in claim 1, wherein each of the first elastic gaskets has:
    a through hole, going through the first elastic gasket itself for the corresponding first fixing part to go through;
    a first collar portion, located between the first bottom board and the second bottom board, and contacting and interfering the first bottom board;
    a second collar portion, located between the circuit board and the second bottom board, and contacting and interfering the circuit board; and
    a jointing portion, connecting the first collar portion and the second collar portion, wherein the diameter of the jointing portion is less than the diameters of the first collar portion and the second collar portion and the jointing portion is locked on the hole wall of the corresponding first opening.

3. The fan module as claimed in claim 2, wherein each of the first openings has a first part and a second part connecting each other, the dimension of each of the first parts is greater than or equal to the diameter of the corresponding first collar portion, the dimension of each of the second parts is less than the diameter of the corresponding first collar portion but greater than or equal to the diameter of the corresponding jointing portion, and all the first parts are located at the same sides of the corresponding second parts.

4. The fan module as claimed in claim 3, wherein the jointing portion of each of the first elastic gaskets is locked on the hole wall of the second part of the corresponding first opening.

5. The fan module as claimed in claim 2, wherein the circuit board has a plurality of second openings respectively corresponding to the position of each of the first elastic gaskets, and an end of each of the corresponding first fixing parts is located in the corresponding second opening.

6. The fan module as claimed in claim 5, wherein the dimension of each of the second openings is greater than or equal to the diameter of the corresponding first fixing part but less than the diameter of each of the second collar portions of the first elastic gaskets.

7. The fan module as claimed in claim 1, wherein the circuit board has a plurality of second openings respectively corresponding to the position of each of the first elastic gaskets, and an end of each of the corresponding first fixing parts is located in the second openings.

8. The fan module as claimed in claim 1, wherein the frame further has two side boards and a plurality of clapboards, the side boards are parallel to each other and vertically connect the second bottom board, the clapboards vertically connect the side boards, each of the fans is located in the space provided by the two side boards and two adjacent ones of the clapboards, and each of the side boards has a plurality of apertures corresponding to the fans.

9. The fan module as claimed in claim 8, wherein each of the side boards has a locking slot structure and the circuit board is locked between the locking slot structure of each of the side boards.

10. The fan module as claimed in claim 8, wherein the chassis further comprises a fans-fixing board perpendicular to the first bottom board, the fan module further comprises a plurality of screws and a plurality of washers, one of the side boards in the frame has a plurality of locking holes, and each of the screws goes through one of the locking holes and one of the washers to be fixed onto the fans-fixing board of the chassis.

11. The fan module as claimed in claim 1, wherein the circuit board has a power socket and a plurality of fan connectors, the power socket is for plugging into an external power source and each of the fans plugs into the corresponding fan connector.

12. The fan module as claimed in claim 1, wherein the circuit board has a third opening to lock a second elastic gasket, and a second fixing part goes through both the third opening and the second elastic gasket to be fixed on the first bottom board of the chassis.

13. The fan module as claimed in claim 12, wherein the third opening has a notch at the edge of the circuit board.

14. The fan module as claimed in claim 12, wherein the second elastic gasket has:
    a through hole, going through the second elastic gasket for the second fixing part to go through;
    a first collar portion, located between the circuit board and the second bottom board, and contacting and interfering the first bottom board;
    a second collar portion; and a jointing portion, connecting the first collar portion and the second collar portion, wherein the diameter of the jointing portion is less than the diameters of the first collar portion and the second collar portion and the jointing portion is locked on the hole wall of the third opening.

15. The fan module as claimed in claim 14, wherein the dimension of the notch of the third opening is greater than or equal to the diameter of the jointing portion of the second elastic gasket.

16. The fan module as claimed in claim 12, wherein the first bottom board has a supporting part disposed at the position corresponding to the place fixing the second fixing part, and the second fixing part is a screw.

17. The fan module as claimed in claim 1, wherein the material of the first elastic gaskets is an antivibration material.

18. The fan module as claimed in claim 1, wherein the first bottom board has a plurality of supporting parts at the position corresponding to the places respectively fixing each of the first fixing parts.

19. The fan module as claimed in claim 1, wherein each of the first fixing parts is a screw.

20. The fan module as claimed in claim 1, wherein the second bottom board further has a plurality of dent regions denting toward the circuit board, the first openings are located at the dent regions, and the thickness of the portion of each of the first elastic gaskets between the first bottom board and the second bottom board is greater than the dent depth of the corresponding dent region.

* * * * *